Feb. 2, 1932.　　　J. A. GRAY ET AL　　　1,843,219
BAIL EAR SOLDERING MACHINE
Filed Sept. 23, 1929　　　4 Sheets-Sheet 1
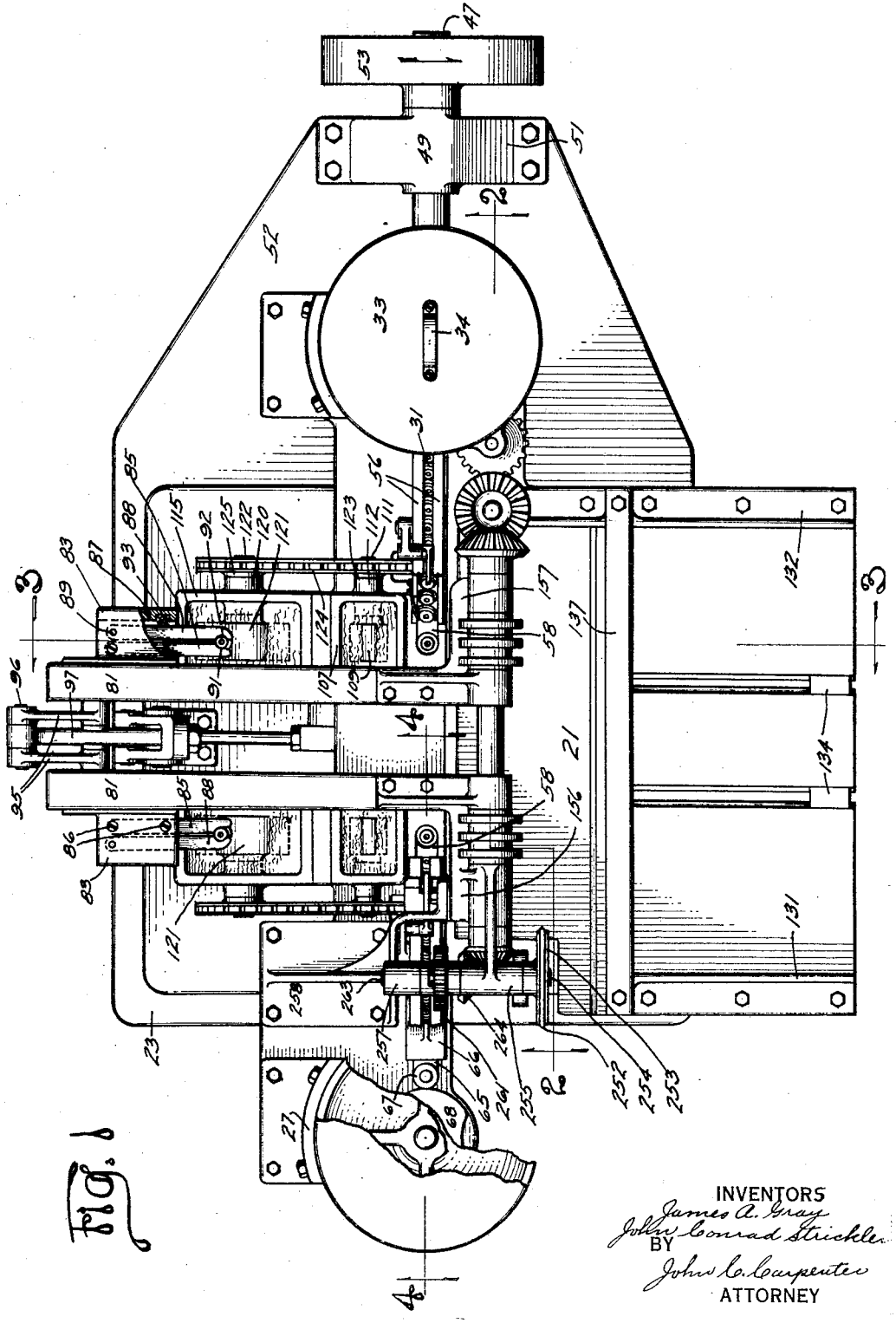
INVENTORS
James A. Gray
John Conrad Strickler
BY
John C. Carpenter
ATTORNEY

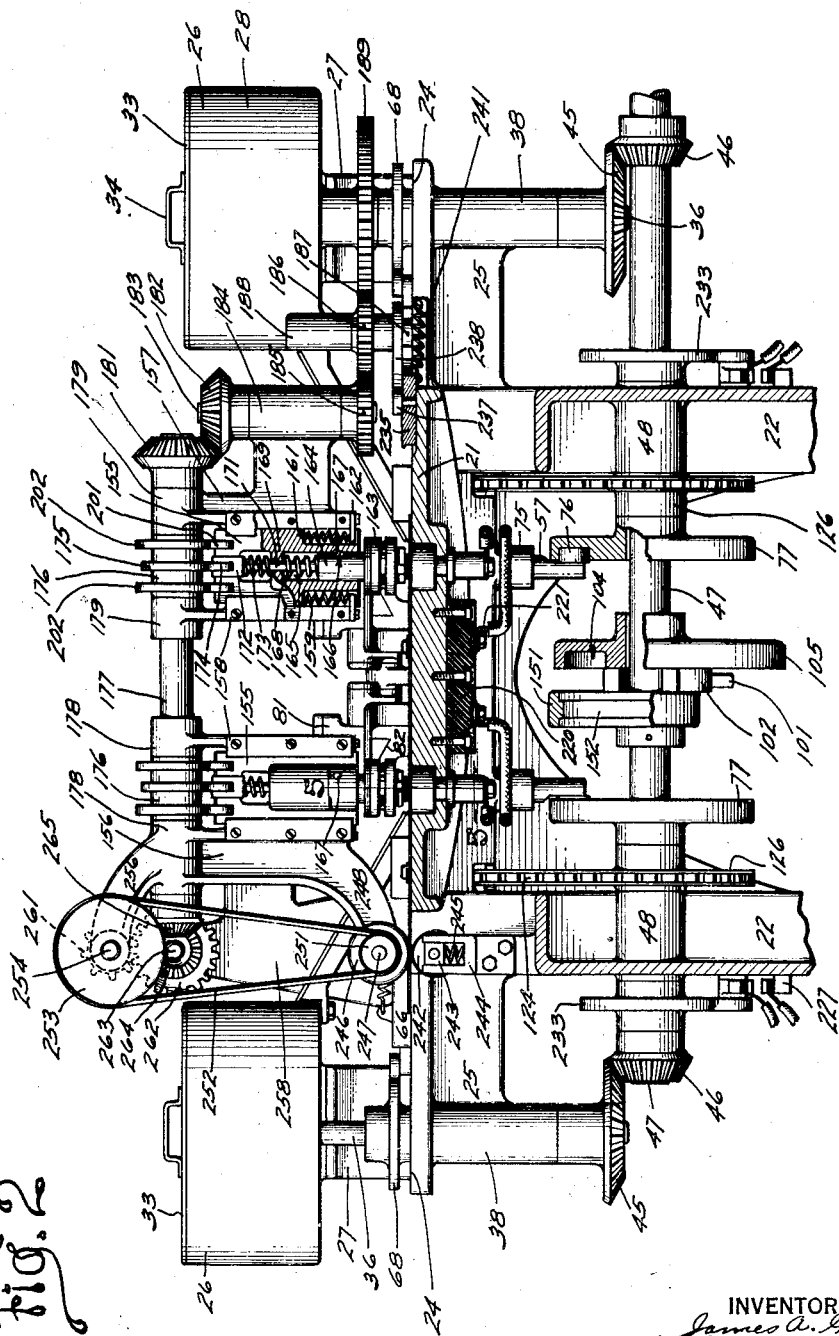

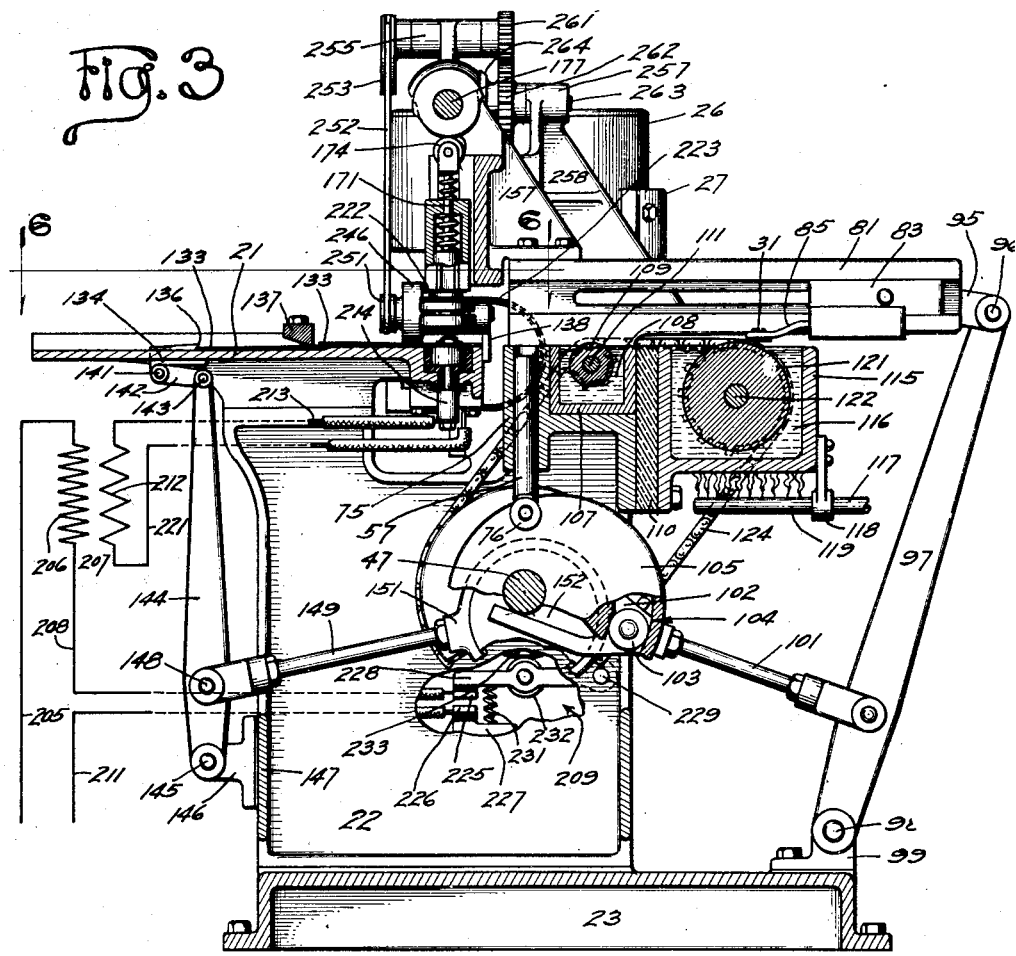

Feb. 2, 1932.  J. A. GRAY ET AL  1,843,219
BAIL EAR SOLDERING MACHINE
Filed Sept. 23, 1929   4 Sheets-Sheet 4

INVENTORS
James A. Gray
John Conrad Stickle
BY
John C. Carpenter
ATTORNEY

Patented Feb. 2, 1932

1,843,219

UNITED STATES PATENT OFFICE

JAMES A. GRAY AND JOHN CONRAD STRICKLER, OF SAN FRANCISCO, CALIFORNIA, ASSIGNORS TO AMERICAN CAN COMPANY, OF NEW YORK, N. Y., A CORPORATION OF NEW JERSEY

BAIL EAR SOLDERING MACHINE

Application filed September 23, 1929. Serial No. 394,452.

The present invention relates to improvements in machines for attaching bail ears to sheet metal container parts and has particular reference to soldering the ear to the container part.

The machine of the present invention contemplates the automatic feeding of bail ears, the application of solder to the bail ears, the positioning of the ears upon a container part and subsequent fusing of the solder to provide firmly united ears.

The principal object of the present invention is the provision of an apparatus having a solder fusing head provided with clamping and heating devices for holding the parts and melting solder which has been previously applied to a bail ear, thereby forming an attachment between the bail ear and a container part.

An important object of the invention is the provision of a mechanism for automatically feeding ears from a magazine, applying flux and solder to the ears so fed and automatically positioning the ears upon a container blank, after which, the ear is soldered in position, the blank being subsequently formed into a container or other suitable form.

A further important object of the invention is the provision of a bail ear carrying device for engaging and securely holding a bail ear and transporting the ear over a fluxing and soldering mechanism by which flux and solder is applied to the ear so carried.

An important object of the invention is the provision of a machine provided with duplicate ear feeding devices, duplicate fluxing and soldering mechanisms and corresponding ear fusing members for soldering two bail ears simultaneously to a container blank.

An important object of the invention is the provision of a machine for receiving a container blank and holding it in position while bail ears are applied thereto after which the blank is automatically ejected from the machine.

A further important object of the invention is the provision of a solder fusing head adapted to engage a bail ear which carries solder and to melt the same during a fusing operation, the heating at the fusing head being performed electrically and in a highly efficient manner.

A still further important object of the invention is the provision of an electrically heated solder fusing head adapted to clamp together a bail ear and a container part in such a manner as to insure the passage of heating currents through the parts of the bail ear and container which are to be united.

A further important object of the invention is the provision of a solder fusing apparatus provided with solder fusing heads which carry an electrical heating current and which are equipped with automatic mechanism for making and breaking the current passing through the heating circuits.

An important object of the present invention is the provision of an apparatus for quickly and efficiently fusing solder between bail ears and a container blank to effect a union of these parts together with the feeding and placing of a blank into position to receive the bail ears and the automatic discharging of the sheet after it has had its bail ears soldered in proper position.

Numerous other objects and advantages of the invention will be apparent as it is better understood from the following description, which, taken in connection with the accompanying drawings, discloses a preferred embodiment thereof.

Referring to the drawings:—

Figure 1 is a plan view of the solder fusing apparatus of the present invention, parts being broken away.

Fig. 2 is a longitudinal section taken substantially along the line 2—2 in Fig. 1.

Fig. 3 is a transverse sectional view taken substantially along line 3—3 in Fig. 1.

Fig. 4 is a sectional view through the bail ear mechanism and ear feeding element, the view being taken substantially along line 4—4 in Fig. 1.

Figure 5:
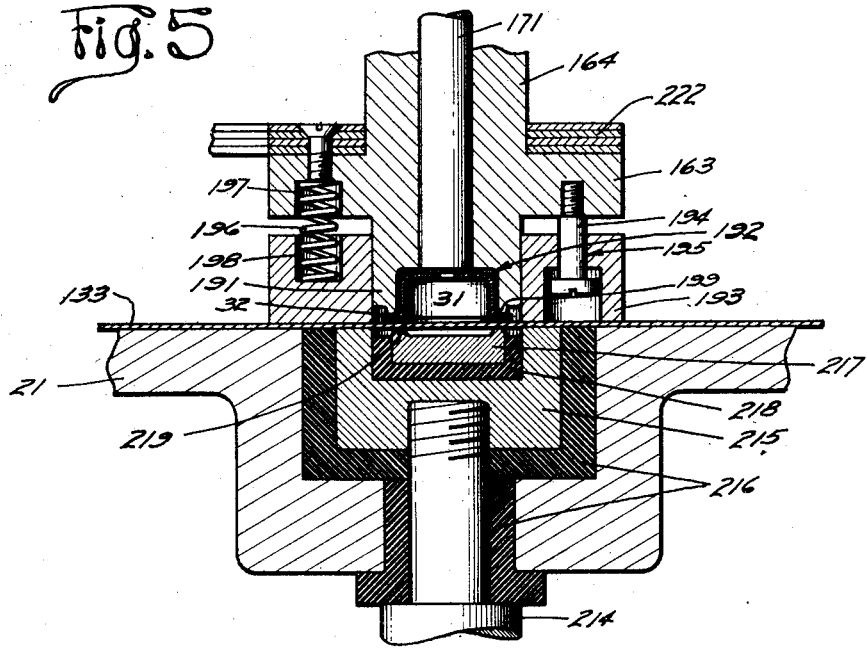
Fig. 5 is an enlarged sectional detail through the solder fusing head, taken substantially along line 5—5 in Fig. 2.

The apparatus shown on the drawings and embodying the present invention is adapted to operate upon a container blank from which containers, or other suitable objects, are subsequently made. The apparatus comprises a table over which the container blank is moved to soldering position and which rests between and beneath a pair of spaced bail ear mechanisms from which bail ears are fed from each side toward the center of the machine.

In the present embodiment, a bail ear from each side mechanism is engaged by a bail ear carrying member and moved from its received position over a fluxing roller, thence over a solder roller, thence back over a fluxing roller and is brought to rest on the container blank positioned on the table. Solder fusing heads, one mounted on each side of the machine carry bail ear clamping devices which hold the bail ear and permit release of each ear from its ear carrying member. Each fusing head then descends on to the ear and an electric current is automatically established, flowing through container blank and ear engaging parts. The blank and ear interpose a resistance to this electric current and are thereby heated, the solder on each bail ear being melted and forming a union between the ear and the container blank.

The blank with its soldered ears is then shifted laterally on the table and is engaged by rotating discharging rollers which move the same out of the machine. A subsequently fed blank then follows, the various operations being performed in the proper sequence just described. All of the working parts of the machine are properly interrelated, this insuring an uninterrupted attaching of bail ears to a succession of container blanks passing through the machine.

Referring to the drawings and particularly to Figs. 1, 2 and 3, it will be observed that a horizontal table 21 is mounted upon spaced frames or legs 22 carried by a base 23. Table 21 is extended on either side to provide horizontal surfaces 24 formed in extension brackets 25 carried by the legs 22. Each extension bracket 25 with its surface 24 supports a bail ear magazine 26 securely mounted on and spaced from the surface 24 by a bracket 27 (Fig. 4).

Each magazine 26 comprises a hollow pan or shell 28 provided with an integral cone shaped bottom 29. A supply of bail ears 31 having annular flanges 32 are placed in each magazine 26 the mass of ears resting upon the cone shaped bottom 29. A removable cover 33 provided with a handle 34 is positioned on the upper rim of the hollow member 28.

A spider 35 is positioned in each magazine and is secured to the upper end of a horizontal shaft 36 journaled in a bearing 37 formed in the bottom wall 29 and in a bearing 38 formed in the extension bracket 25. The spider and its shaft are adapted to rotate and during such movement carry stirring rods 41, which project downwardly from the arms of the spider, around the inside of the magazine and over the bottom member 29. These rods constantly pass through the mass of ears stirring and loosening them and causing some of the ears to rest with their flanged ends flat against the upper surface of the bottom member 29. Some of these ears during their rotary travel come into a position adjacent an opening 42 formed in one side wall of the shell. This opening is so formed as to permit one and only one properly positioned ear to pass therethrough at one time.

Each shaft 36 carries a bevel gear 45 (Fig. 2) which is secured to its lower lower end and gear 45 meshes with a bevel pinion 46 mounted on a horizontal drive shaft 47 journaled in bearings 48 formed in the legs 22 and in a bearing 49 (Fig. 1) carried by a bracket 51 bolted to an extension 52 of the base 23. The drive shaft 47 adjacent the bearing 49 carries a pulley 53 to which power is applied to rotate the drive shaft in any suitable manner.

An ear 31 passing through the opening 42 (Fig. 4) moves by gravity over an inclined surface provided by a plate 55 connecting the shell 28 and the bracket surface 24. The ears resting on the upper surface of the plate 55 are held in processional order by side guide bars 56 (see also Fig. 1) mounted on the plate 55 and spaced on either side of the bail ears 31.

The bail ear 31 (Fig. 4) at the lower end of the line upon reaching the surface 24 is then in position to be moved on the upper end of a lifting rod 57 mounted in the table and having two vertical positions. Rod 57 in lowered position rests with its upper surface in horizontal alignment with the upper surface of a slot 58 cut in the table 21. This lowermost bail ear 31 is moved along the slot 58 and on to the upper end of the rod 57 by an arm 59 pivoted at 61 to a lever 62 mounted on a pin 63 carried by plate 55 and pivotally connected at its lower end to a link 64 pivoted to a slide 65 slidably held on surface 24 of the bracket 25 by means of a slotted block 66.

Slide 65 carries a cam roller 67 which engages a cam 68 keyed to the shaft 36. A coil spring 69 is interposed between the slide 65 and the block 66 and insures constant engagement of the cam roller 67 against the cam 68.

Rotation of cam 68 brings its low point against the roller 67 and allows slide 65 to move toward the left (Fig. 4) under action of spring 69, this rocking the lever 62 about its pivot 63 and moving the arm 59 toward the right. This arm in backward or nonoperating position rests on a rounded cam block 71 which holds a forward tapered end 72 of the arm 59 above the bail ears 31 resting between the guides 56. As arm 59 moves toward the right under the action just described, its forward end 72 is lowered between the guides 56 and behind the lowermost bail ear 31. Continued movement of the arm 59 toward the right slides the engaged bail ear along the slot 58 and in position upon the upper end of the rod 57. The lowermost ear being thus moved from its position in line upon the plate 55, the entire line or row of bail ears move downwardly the distance of one ear until stopped by the surface of the slot 58.

Continued rotation of the cam 68 brings its high point against the roller 67, moving slide 65 toward the right, (Fig. 4) rocking lever 62 to move arm 59 toward the left during which movement it rides upon the cam block 71 and its end 72 is lifted clear of the ears coming back to normal position as illustrated in Fig. 4.

Rod 57 (Figs. 2, 3, and 4) has a vertical movement within a bearing 75 formed in the table 21 its lower end carrying a cam roller 76. Roller 76 operates within the cam groove of a face cam 77 keyed to the shaft 47. Inasmuch as there are two magazines 26 with associated ear feeding elements there are two ears being moved simultaneously to their respective lifting rods 57.

Spaced side plates 81 are bolted to the table 21 adjacent the bearing 75 and each plate 81 is provided with a dovetail groove 82 which forms a slideway for a slide 83. Each slide moves back and forth along its slideway and supports an ear carrying member adapted to receive an ear from its associated rod 57.

Each ear carrying member comprises a stationary arm 85 (Fig. 1) secured by screws 86 to the slide 83 the arm being positioned within a slot 87 extending through the slide. A movable arm 88 is positioned within the slot 87 and is pivoted at 89 to the slide 83. Arm 85 cooperates with arm 88 to hold a bail ear 31 when it is raised to a position between the arms by the rod 57.

For this purpose, arm 85 is provided with a semi-circular slot 91 formed in its extremity which is adjacent a similar slot 92 formed in the end of the arm 88. The two slots 91 and 92 form a pocket for the ear and hold it securely when the ear is in place. Arm 88 is provided with a spring 93 positioned between the outer wall of the arm and a wall of the slot 87 and this yieldingly forces the arm 88 toward the arm 85 forming a flexible two-wall pocket for the ear.

Slide 83 is moved back and forth in synchronism with the feeding of the ear and at one intermediate position in its travel the ear pocket of the arms 85 and 88 is brought to rest over the rising plunger or rod 57. This occurs after it has deposited the previous bail ear on the blank in soldering position as hereinafter described. The latter is thereupon raised with its bail ear and the rounded top part of the ear is brought against the arms 85 and 88 and the ear is forced into the slots 91 and 92, spring 93 permitting slight separation of the arms. With the ear in its clasped position between the arms 85 and 88 slide 83 is moved backward carrying the ear first over fluxing devices and thence over soldering devices. There being two slides 83 and two sets of arms 85 and 88, two bail ears 31 are being simultaneously lifted on their respective rods 57 and carried back and forth for fluxing and soldering.

Each slide 83 (Figs. 1, 2 and 3) carries a link 95 which pivotally connects at 96 to the upper end of a lever 97 pivoted at 98 on a bracket 99 carried by the base 23. Lever 97 is adapted to reciprocate back and forth on its pivot 98 and is cam actuated, being pivotally connected by a rod 101 with a cam yoke 102 embracing the shaft 47 and carrying a cam roller 103. Roller 103 operates in a cam groove 104 formed in a face cam 105 carried by the shaft 47.

Reciprocation of the lever 97 causes the slides 83 to move in unison along their respective slideways and this action carries the arms 85 and 88 of each slide back and forth to move each ear held thereby.

The fluxing devices are also in pairs, one for each ear and comprise tanks 107 (Figs. 1 and 3) set in the table 21. Each tank 107 is adapted to contain liquid flux 108, this constituting a fluxing bath. A horizontal roller 109 is mounted in the fluxing bath and rotates with shaft 111 journaled in a bearing 112 formed in the side wall of the tank. Roller 109 is constantly rotated being partially submerged in the flux 108 and the roller lifts a film of flux from the bath as it rotates. As the slide 83 moves a bail ear 31 over the fluxing bath, the flange 32 thereof lightly engages this film of flux on the surface of the roller and collects a film of flux on its flange 32.

The ear soldering devices comprise solder tanks 115 (Figs. 1 and 3) arranged in pairs each tank being bolted to the table 21 and to the legs 22 adjacent a fluxing tank 107. Tank 115 is insulated from the frame of the machine by an insulating strip 110 this preventing, to a great extent, conduction of heat to the other parts of the machine. Each tank 115 is adapted to contain solder 116 which is maintained in a liquefied condition during the operation of the machine by a heating element preferably comprising a gas pipe 117 carried on a bracket 118 bolted to the tank 115 and connecting with a gas burner 119 positioned beneath the tank. The tank, solder and associated parts thus constitute a solder bath for the ear soldering operation.

A solder roller 121 is mounted on a horizontal shaft 122 and rotates partially submerged in the solder 116 of the solder bath. Shaft 122 is journaled in a bearing 120 formed in one side wall of the tank 115. As the roller 121 rotates within the molten solder, a film of the solder is lifted on its surface and this is engaged by the previously fluxed flange 32 of the bail ear 31 as the latter is carried across the solder bath. Solder is in this way deposited upon the flange of the ear.

Rollers 109 and 121 (Figs. 1 and 3) of each of the fluxing and soldering devices are continually rotated by connection with the drive shaft 47. Shaft 111 which carries roller 109 carries a sprocket 123 over which operates a link chain 124 passing over a sprocket 125 secured to the shaft 122 on which roller 121 is mounted. Chain 124 operates over a sprocket 126 and is driven thereby, sprocket 126 being carried by the drive shaft 47. This mechanism insures rotation of the fluxing roller and the solder roller and a constant and uniform lifting of liquid flux and liquid solder is thereby obtained.

Table 21 (Figs. 1, 3 and 6) carries spaced guide rails composed of angle irons 131 and 132 and these form a guideway for a metal sheet or container blank 133. Blank 133 may be positioned on table 21 between the guides 131 and 132 by hand or in any suitable manner. The rear edge of the blank 133 when so placed is engaged by a pair of spaced slides 134 each operating in a slot 135 formed in the table 21. Each slide 134 is formed with a notched shoulder 136 which extends above the surface of the table and it is these shoulders that engage the rear edge of the blank. Slides 134 are moved inwardly and the blank 133 moves over the surface of the table and beneath a bar 137 spaced above and secured to the angle irons 131 and 132. At the completion of the inward travel of the slides 134, the blank moved thereby is in front of the bar 137 and its forward edge rests against a pair of spaced stop plates 138 carried by the table 21. In this position, the blank is in proper location to receive the fluxed and solder-coated ears carried by the ear carrying members.

Figure 6:
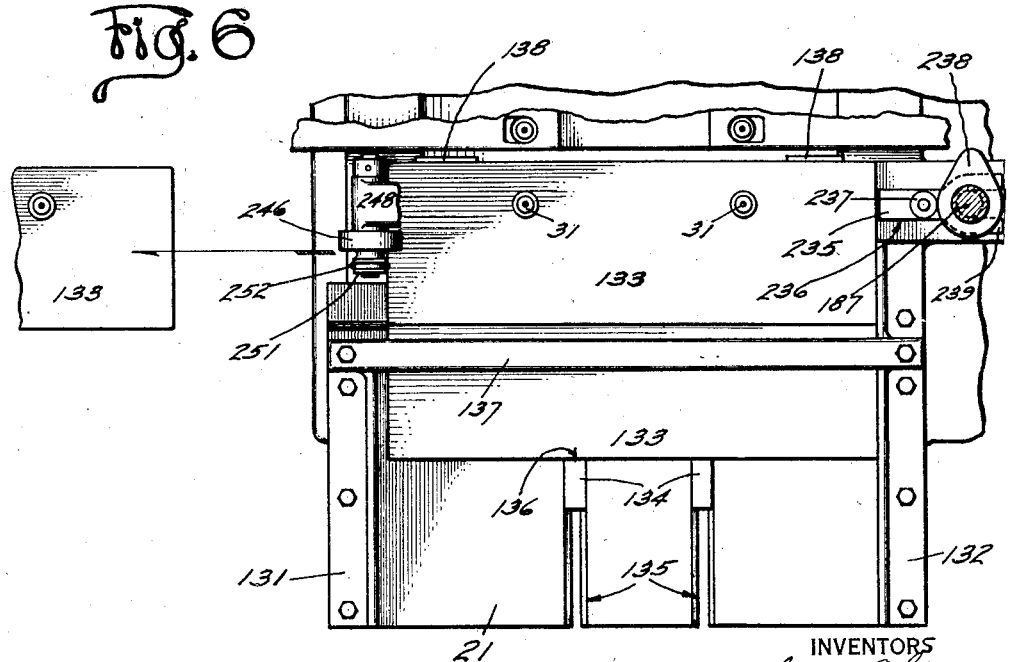
Fig. 6 is a plan view of the lower part of the apparatus illustrating a container blank with bail ears applied, parts being broken away, the view being taken on a plane above the blanks.

While the blank remains in this position, the slides 134 move back to receive another blank. The ear fusing operation is not fully completed on the blank adjacent the stop plates 138 before the next blank is received and moved forward. Its forward edge moves under the rear edge of the first blank as illustrated in Figs. 3 and 6. Bar 137 insures a proper overlapping of the blanks. As will be more fully described, the forward blank with its attached ears will be immediately removed laterally (Fig. 6) as the following blank comes to position against the stop plates. This prevents lost motion or delays in operation and increases the production of the machine.

Each slide 134 is moved back and forth by a mechanism connecting with the drive shaft 47 (Fig. 3). The slide 134 is pivotally connected at 141 to a link 142. Each link 142 is pivoted at 143 to one arm of a bifurcated lever 144 oscillating on a pivot pin 145 carried by a bracket 146 secured to one of a pair of cross members 147 which connect the legs 22. Lever 144 is pivotally connected at 148 to a connecting rod 149 secured to an eccentric strap 151 mounted on an eccentric 152 carried by the shaft 47 (see also Fig. 2).

Each bail ear 31 by first moving over the fluxing roller 109 and receiving its film of flux is properly prepared for the film of solder which it next receives in its travel over roller 121. The solder so applied immediately solidifies and the ear with its solder-coated surface is then again moved back over the roller 109 and receives a film of flux on the outer surface of the solidified solder. Continued backward movement of the ear carrying members brings each fluxed, soldered and re-fluxed ear 31 over and past the lifting rod 57 while the latter is depressed (Fig. 3) and into position over the blank 133 resting on the table against the stop plates 138 (Fig. 6). The ear carrying members pause in this position and each ear 31 is held slightly above the blank 133 in axial alignment with and directly beneath a solder fusing head.

Each solder fusing head is carried by a slide 155 one of the slides having vertical movement in a bracket 156 bolted to one of the plates 81, the other slide having vertical movement in a bracket 157 bolted to the other plate 81 (Figs. 1, 2 and 3). Each slide 155 is retained in suitable guideways by plates 158 located on opposite sides of the slide and bolted respectively to the bracket 156 and the bracket 157.

Each slide 155 is normally held in raised position by springs 159 (Fig. 2) which are located in chambers 161 formed therein. Springs 159 are supported on plates 162 secured to the respective brackets 156 and 157 adjacent the plates 158 and the weight of the slides rest on said springs 159.

Slide 155 (Figs. 2 and 5) carries a block 163 provided with a stem 164 positioned in a central chamber 165 formed in the slide 155. Stem 164 has slight vertical movement within the chamber 165 and this movement is limited by the extent of a slot 166 formed in the stem 164 in which is located a pin 167 fixed in the slide 155. A spring 168 is located in the chamber 165 between the upper end of the stem 164 and a partition wall 169 forming the end of the chamber. This spring normally holds stem 164 and block 163 in an extended position, the upper end of the slot 166 resting against the pin 167. This construction provides a yielding connection between the stem 164 and the slide 155 for a purpose hereinafter more fully described.

A rod 171 (Figs. 2, 3 and 5) having a combined clamping and knockout action passes vertically through the center of the wall 169 of each slide 155 and through the center of the stem 164. Rod 171 carries at its upper end a block 172 and a spring 173 surrounding the rod 171 is interposed between the wall 169 and the block 172 and normally holds the latter with its rod 171 in raised position. Block 172 carries a cam roller 174 which is held against a cam ring 175 of a cam 176 by action of the spring 173. Cam 176 is carried on a horizontal shaft 177 journaled in bearings 178 formed in the bracket 156 and in bearings 179 formed in the bracket 157.

Shaft 177 is rotated by connection with the drive shaft 47 as illustrated in Fig. 2. Shaft 177 carries a bevel gear 181 which meshes with a similar gear 182 secured to the upper end of a vertical shaft 183 journaled in a bearing 184 carried by the bracket 157. Shaft 183 at its lower end carries a spur gear 185 which meshes with an intermediate gear 186 secured to a shaft 187 journaled in a bearing 188 projecting from one of the magazine shells 28. Gear 186 also meshes with a gear 189 secured to the shaft 36 of one of the bail ear magazines 26.

As the high point on each cam ring 175 engages its roller 174, block 172 and rod 171 move downwardly on top of the particular bail ear held therebeneath by the arms 85 and 88 and partially eject the same from carrying position and move it to the container blank 133 positioned on the table 21 and here both ears are firmly clamped on the sheet and held during the solder fusing operation. Following this ear ejecting operation, the slides 83 start moving on their return stroke, the rods 171 at such time being in lowered position and extending within the slots 91 and 92. To disengage the arms 85 and 88 from the ears 31 and the rods 171 on this initial return movement, the arms 88 unclamp slightly by reason of their springs 93, and the ear carrying members thereupon snap off of the ears 31 and the rods 171.

Each block 163 (Fig. 5) is provided with a lower extension 191 in which is formed a central chamber 192 adapted to surround the bail ear 31 held by the rod 171 when in lowered position. Block 163 carries a ring 193 which is movably mounted on the extension 191 and held against displacement by cap screws 194 threadedly engaged in the block 163. Screws 194 pass through openings 195 formed in the collar 193 and springs 196 interposed between the block 163 and the collar 193 tend to separate these parts, this separation being limited by the heads of the screws. Springs 196 are seated in bores 197 and 198 formed respectively in the block 163 and the collar 193.

Block 163 is moved downwardly with lowering of its slide 155 and the collar 193 first engages the blank 133 in a circular area surrounding the clamped ear and holds it while the block 163 continues further downward movement, the springs 196 permitting this action. An annular clamping ridge 199 formed on the end of extension 191 then engages the flange 32 of the bail ear 31, this also holding the blank 133 on the table 21, as illustrated in Fig. 5.

The described lowering of the blocks 163 and slides 155 is brought about against the action of the springs 159 by a cam mechanism illustrated in Fig. 2. Each slide 155 carries a pair of spaced cam rollers 201 and each roller is adapted to engage a cam ring 202 formed in the cam 176. Springs 159 hold these rollers against their spaced cam rings 202 and as the high points on the cams 202 pass thereby, each slide 155 is moved downwardly carrying its block 163. When the annular ridge 199 of the block 163 engages the bail ear 31, it is stopped against further movement and continued downward movement of the slide 155 is permitted by compression of the spring 168. This also provides a yielding clamping of the bail ears.

With each bail 31 clamped by the fusing heads, as just described, the solder adhering to the flange thereof is melted to effect a union between the ear and the can body blank. This fusing is accomplished by a heating of the solder on the bail ear and this heating action preferably utilizes an electrical heating circuit which will now be described. Each fusing head has an independent heating circuit and a description of one of these circuits will suffice for an understanding of both circuits.

A satisfactory electrical heating circuit is diagrammatically illustrated in Fig. 3 and comprises a primary circuit receiving energy from any suitable source. The wiring for this circuit comprises a lead wire 205 passing into a primary winding 206 of a step down transformer 207, a wire 208 passing through a switch indicated generally by the numeral 209 and connecting at certain times the wire 208 with a lead wire 211 forming the opposite side of the primary circuit. The electrical heating circuit is made up of a wiring circuit including a secondary winding 212 of the transformer 207.

This secondary transformer winding 212 is electrically connected, by a wire 213, with a stem 214 threadedly secured to a block 215 (see also Fig. 5) the block 215 and stem 214 being insulated from but carried by the table 21 by means of insulated bushings 216. Block 215 is cup-shaped and contains a button 217 insulated therefrom by an insulated bushing 218. Button 217 is provided with an annular ridge 219 which engages the under surface of the blank 133 directly opposite the flange 32 of the clamped bail ear 31.

The other side of the secondary winding 212 (Fig. 3) is connected by a wire 221 leading to one end of a series of laminated copper plates 222 (Fig. 5) secured in position on block 220 (Fig. 2) formed of insulating material and secored to the table 21. Plates 222 are disposed in a semi-circular form providing a loop 223, which permits slight movement between the ends thereof in a well-known manner, the upper end of the plates being electrically connected with the block 163.

When the primary circuit is closed at the switch 209 (Fig. 3) current will flow through the primary of the transformer 207. At such a time, the parts of the solder fusing heads are in the position illustrated in Fig. 5 and an induced secondary current will be caused to flow through the secondary windings of the transformer 207 and through wire 213, stem 214, block 215, through the metal of the blank 133 adjacent the block 215 through the solder and the flange 32 of the bail ear 31 thence through the extension 191 and the block 163 back through the strips 222 and wire 221 thus completing the secondary circuit.

The resistance offered by the relatively thin metal of the bail ear and the blank is sufficient to cause an accumulation of heat in the ridge 199 and in the bail ear 31 and in that part of the blank 133 in the path of the electrical current and these parts are raised to a temperature sufficiently high to fuse the solder on the bail ear. This action is practically instantaneous and results in a union between the bail ear and the blank, it being remembered that flux carried on the solder on the ear is interposed between the solder and the blank adjacent.

Each switch 209 (Figs. 2 and 3) comprises a contact plate 225 for the wire 208 and a similar plate 226 for the wire 211, plate 226 being held in fixed position by a bracket 227 secured to leg 22. Contact plate 225 is carried on the end of a lever 228 pivoted on a shaft 229 carried by the leg 22. Normally the contact end of this lever is held in a raised position by a spring 231 interposed between it and the bracket 227. When in raised position, the contact plates 225 and 226 are separated, (as shown in Fig. 3) and this breaks the circuit of the primary current.

Lever 228 carries a cam roller 232 which engages the peripheral surface of a cam 233 secured to the shaft 47, it being held in engagement with the cam by action of the spring 231. As the high point of the cam engages the roller 232 it causes an oscillation of the lever 228 which closes the connection between contact plates 225 and 226 and permits electrical current to flow through the primary circuit.

This making and breaking of each circuit by its switch 209 is in synchronism with the clamping and unclamping of the ear by the solder fusing head. Following the fusing operation, the current is broken at the switch 209 prior to lifting of the fusing head and this permits a brief time to elapse to allow the solder to set while the ear is still held in clamped position.

Each fusing head is then raised, its slide 155 first picking up its block 163 while allowing the collar 193 associated therewith to rest on the sheet and prevent lifting of the sheet with the fusing head. Further lifting action of the slide moves the block 163 and its ring 193 to a position entirely above the top of the ear 31. During this lifting movement, rod 171 remains in its lowered ear clamping position and prevents lifting of the sheet and ear with the lifting action of the collar 193.

With the two collars 193 of their respective fusing heads in raised position clear of the tops of the soldered ears, the rods 171 are then moved to normal position after which the blank 133 is pushed toward the left, as viewed in Fig. 2, prior to its discharge.

This shifting of the blank 133 is cam controlled (Figs. 2 and 6) a slide 235 being provided for engagement with the blank. Slide 235 has movement in guideways 236 formed in the table 21 being located adjacent one side of the blank 133 when in its ear receiving position. Slide 235 extends above the edge of the blank 133 to permit engagement therewith and carries a cam roller 237 which engages the periphery of a cam 238 secured to and rotating with the shaft 187. Slide 235 is provided with a yoke extremity 239 which straddles the shaft 187 and holds the slide in accurate alignment.

A spring 241 (Fig. 2) is interposed between the slide 235 and a part of the table 21 and this holds the roller 237 against its cam 238. Rotation of the cam 238 by reason of its contour at a proper time forces the slide 235 against the blank 133 and moves it toward the left, this movement of slide 235 being made against the action of the spring 241. The opposite edge of the blank 133 is thereupon engaged between discharging rollers which withdraws it from its position on the table and ejects it out of the machine.

The discharging mechanism (Fig. 2) includes an idler roller 242 mounted in bearing blocks 243 sliding in a bracket 244 secured to one of the brackets 25. Springs 245 positioned in the bracket 244 beneath each block 243 force the roller 242 upwardly to normally engage with a roller 246 mounted on a shaft 247 carried in an extension 248 of the bracket 156. Roller 246 is constantly rotated and by reason of the engagement with roller 242 the latter is also rotated on its axis. When the forward edge of a blank 133 is introduced between the rollers 242 and 246 by action of the slide 235 as previously described, spring 245 permits the proper separation of the rollers and the blank thereupon comes under the influence of the rotating rollers and is thereby discharged.

Roller 246 carries a sheave 251 (Figs. 1, 2 and 3) over which operates a rope drive 252 passing over an upper sheave 253 secured to a shaft 254 rotating in a bearing 255 carried in an extension 256 of the bracket 156.

Shaft 254 is positively driven by a pinion 261 secured thereto and meshing with a spur gear 262 carried on a horizontal shaft 263 journaled in a bearing 257 formed in a bracket 258 mounted on one of the extension plates 24. Shaft 263 carries a bevel gear 264 which meshes with a similar gear 265 secured to the shaft 177. Continued rotation of the shaft 177 through the gear and rope drive connection just described causes a corresponding rotation of the discharge rollers 246 and 242.

As illustrated in Fig. 3 and as previously alluded to, a blank 133 is introduced into the machine and is fed forward at the same time that the preceding blank which has received its soldered ears is being moved out of the machine by the discharge mechanism. The preceding blank, however, is fully discharged before the succeeding blank is brought into final ear receiving position.

Thus while the solder fusing heads are in lowered position and during the action of fusing of the solder between ear and blank, a subsequent pair of ears is being provided with solder. As soon as the ear carrying members have released a pair of ears, after placing them in axial alignment with the solder fusing heads, these members are moved to a position to receive the newly fed ears. During the time that these latter ears are being fluxed and soldered the fusing of the solder on the preceding ears and the discharge of the completed container blank is taking place. Immediately upon removal of the blank with its applied ears, a subsequent blank is brought into position on the table as the newly fluxed and soldered ears are brought to the fusing heads. This coaction of parts provides a machine of high efficiency and insures a large output.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a bail ear soldering machine, the combination of a solder fusing head for soldering a bail ear on a container part, ear feeding instrumentalities for positioning an ear on the container part adjacent the solder fusing head, and means for applying flux to said ear and means for applying solder to said ear prior to its reaching said container part.

2. In a bail ear soldering machine, the combination of a solder fusing head for soldering a bail ear on a blank from which a container is to be made, a blank feeding device for locating the blank in position to receive its bail ear, ear feeding instrumentalities for positioning an ear on the blank adjacent the solder fusing head, and means for applying solder to said ear prior to its reaching said blank.

3. In a bail ear soldering machine, the combination of a solder fusing head for soldering a bail ear on a container part, ear feeding instrumentalities for positioning an ear on the container part adjacent the solder fusing head, means for applying solder to said ear prior to its reaching said container part, and means for heating the bail ear in said solder fusing head to fuse the solder on the ear and effect a union between it and the container part, and means for clamping the bail ear to the container independent of the heating of the parts.

4. In a bail ear soldering machine, the combination of a solder fusing head for soldering a bail ear on a container part, means for feeding container parts successively in line with the fusing head, ear feeding instrumentalities for positioning an ear containing solder on the container part adjacent the solder fusing head, means for moving said head to the positioned ear to clamp the same against the container part, and means for heating the bail ear in said solder fusing head to fuse the solder on the ear and effect a union between it and the container part, and means for applying solder to said ear prior to its reaching said container part.

5. In a bail ear soldering machine, the combination of a solder fusing head for soldering a bail ear on a container part, ear feeding instrumentalities for positioning an ear on the container part adjacent the solder fusing head, means for applying flux and means for applying solder to said ear prior to its reaching said container part.

6. In a bail ear soldering machine, the combination of a solder fusing head for soldering a bail ear on a container part, ear feeding instrumentalities for positioning an ear containing solder on the container part adjacent the solder fusing head, means for moving said head to the positioned ear to clamp the same against the container part, and means including an electrical circuit for heating the bail ear in said solder fusing head to fuse the solder on the ear and effect a union between it and the container part.

7. In a bail ear soldering machine, the combination of a solder fusing head for soldering a bail ear on a container part, ear feeding instrumentalities for positioning an ear containing solder on the container part adjacent the solder fusing head, means for moving said head to the positioned ear to clamp the same against the container part, electrical means for heating the bail ear in said solder fusing head to fuse the solder on the ear and effect a union between it and the container part, and a switch included in the electrical circuit of the heating means for making and breaking the current flowing therein in synchronism with the clamping and unclamping of the bail ear, and operating mechanism connected with the fusing head and ear feeding instrumentalities and switch.

8. In a bail ear soldering machine, the combination of a solder fusing head for soldering a bail ear on a container part, a magazine for bail ears, ear feeding instrumentalities for positioning an ear on the container part adjacent the solder fusing head, said instrumentalities comprising an ear feeding element for advancing an ear from the magazine and an ear carrying member for receiving the advanced ear and moving it into position on the said container part, a fluxing bath and a solder bath, and devices adjacent the path of the ear carrying member for applying flux and solder to the bail ear as the same is moved by said carrying member, and operating mechanism connected with the fusing head and ear feeding element and ear carrying member.

9. In a bail ear soldering machine, the combination of a solder fusing head for soldering a bail ear on a container part, a magazine for bail ears, ear feeding instrumentalities for positioning an ear on the container part adjacent the solder fusing head, said instrumentalities comprising an ear feeding element for advancing an ear from the magazine and an ear carrying member for receiving the advanced ear and moving it into position on the said container part, a fluxing bath and a solder bath, devices for applying flux and solder to the bail ear as the same is moved by said carrying member, and means for heating the bail ear in said solder fusing head to fuse the solder on the ear and effect a union between it and the container part.

10. In a bail ear soldering machine, the combination of a fluxing bath, a solder bath, a bail ear carrying member for moving a bail ear over said baths and positioning it on a container part, a fluxing device in said fluxing bath for applying flux to the ear during its movement, a solder applying device in said solder bath for applying solder to the moving ear, and a solder fusing head for clamping the positioned, solder containing ear on the container part and soldering it thereto, and operating mechanism connected with said carrying member and fusing head.

11. In a bail ear soldering machine, the combination of a fluxing bath, a solder bath, a bail ear carrying member for moving a bail ear over said baths and positioning it on a container part, a fluxing device in said fluxing bath for applying flux to the ear during its movement, a solder applying device in said solder bath for applying solder to the moving ear, a solder fusing head for clamping the positioned solder contained ear on the container part, and means for heating the bail ear in said head to fuse the solder and effect a union between the ear and the container part, and operating mechanism connected with said carrying member and fusing head.

12. In a bail ear soldering machine, the combination of a slide, a slideway in which said slide has movement, a solder bath positioned adjacent said slideway, a fluxing bath positioned adjacent said solder bath, rolls rotating respectively in said baths, a bail ear carrying member mounted on said slide and comprising a fixed arm and a pivoted arm for holding a bail ear therebetween, feeding devices for positioning a bail ear in said arms, means for moving the said slide and the said arms to carry the bail ear over the solder and fluxing rollers in their respective baths whereby solder and flux are applied to the ear, and means for soldering said ear to a container part.

13. In a bail ear soldering machine, the combination of a slide, a slideway in which said slide has movement, a solder bath positioned adjacent said slideway, a fluxing bath positioned adjacent said solder bath, rolls rotating respectively in said baths, a bail ear carrying member mounted on said slide and comprising a fixed arm and a pivoted arm for holding a bail ear therebetween, feeding devices for positioning a bail ear in said arms, means for moving the said slide and the said arms to carry the bail ear over the solder and fluxing rollers in their respective baths whereby solder and flux are applied to the ear, a device for clamping the solder containing ear to a container part at the same time releasing it from the carrying member, and a solder fusing head for fusing the solder on the clamped bail ear to effect a union between it and the container part.

14. In a bail ear soldering machine, the combination of a slide, a slideway in which said slide has movement, a solder bath positioned adjacent said slideway, a fluxing bath positioned adjacent said solder bath, rolls rotating respectively in said baths, a bail ear carrying member mounted on said slide and comprising a fixed arm and a pivoted arm for holding a bail ear therebetween, feeding devices for positioning a bail ear in said arms, means for moving the said slide and the said arms to carry the bail ear over the solder and fluxing rollers in their respective baths whereby solder and flux are applied to the ear, a device for clamping the solder containing ear to a container part and releasing it from the carrying member, a solder fusing head for engaging the clamped ear, and means for heating the bail ear in said head to fuse the solder on the ear and effect a union between it and the container part.

15. In a bail ear soldering machine, the combination of a plurality of solder fusing heads for soldering bail ears on a container part, ear feeding instrumentalities for positioning an ear on the container part adjacent each solder fusing head, and means for applying solder to said ears prior to their reaching said container part, means for applying solder to said ears, and means for applying flux before and after said application of solder.

16. In a bail ear soldering machine, the combination of a plurality of solder fusing heads for soldering bail ears on a blank from which a container is to be made, a blank feeding device for locating said blank in position to receive the bail ears, ear feeding instrumentalities for positioning the ears on the blank adjacent the solder fusing heads, and means for applying solder to said ears prior to their reaching said blank.

17. In a bail ear soldering machine, the combination of a plurality of solder fusing heads for soldering bail ears on a blank from which a container is to be made, a blank feeding device for locating said blank in position to receive the bail ears, ear feeding instrumentalities for positioning the ears on the blank adjacent the solder fusing heads, means for applying solder to said ears prior to their reaching said blank, and discharge means for removing said blank after the ears have been soldered thereto.

18. In a bail ear soldering machine, the combination of a plurality of solder fusing heads for soldering bail ears on a blank from which a container is to be made, a blank feeding device for locating said blank in position to receive the bail ears, ear feeding instrumentalities for positioning the ears on the blank adjacent the solder fusing heads, means for applying solder to said ears prior to their reaching said blank, and discharge means for removing said blank after the ears have been soldered thereto, said discharge means comprising discharge rollers for ejecting the blank from the machine and means for feeding the blank into the discharge rollers after the ears have been soldered thereon.

JAMES A. GRAY.
JOHN CONRAD STRICKLER.